US008208882B2

(12) United States Patent
Hsieh et al.

(10) Patent No.: US 8,208,882 B2
(45) Date of Patent: Jun. 26, 2012

(54) ANTENNA SENSE CIRCUIT AND DIGITAL RADIO RECEIVER THEREOF

(75) Inventors: Chen-An Hsieh, Taipei Hsien (TW); Cheng-Hsiung Hsu, Taipei Hsien (TW); Tsai-Wang Chang, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 344 days.

(21) Appl. No.: 12/612,686

(22) Filed: Nov. 5, 2009

(65) Prior Publication Data
US 2011/0058628 A1 Mar. 10, 2011

(30) Foreign Application Priority Data
Sep. 8, 2009 (TW) ............................... 98130192 A

(51) Int. Cl.
*H04B 17/00* (2006.01)
(52) U.S. Cl. ....... 455/226.1; 455/97; 455/107; 455/121; 455/129
(58) Field of Classification Search .................. 455/107, 455/121, 127.4, 129, 280–294
See application file for complete search history.

(56) References Cited

U.S. PATENT DOCUMENTS
2005/0059359 A1* 3/2005 Dornbusch ...................... 455/78
2005/0162570 A1* 7/2005 Hall et al. ...................... 348/735

OTHER PUBLICATIONS
TL393 Dual Differential Comparators, Texas Instruments 1993.*
* cited by examiner

*Primary Examiner* — Nguyen Vo
*Assistant Examiner* — Stacey Sorawat
(74) *Attorney, Agent, or Firm* — Winston Hsu; Scott Margo

(57) ABSTRACT

An antenna sense circuit includes a detector and a level shifter. The detector consists of a voltage drop component, a transistor component, a first resistor component, and a second resistor component. The voltage drop component is coupled between a first power supply and a first terminal of the first resistor component. The second resistor component has a first terminal coupled to a second terminal of the first resistor component and a second terminal coupled to a second power supply. The transistor component has a control terminal coupled to the second terminal of the first resistor component and the first terminal of the second resistor component, a second connection terminal coupled to the first power supply, and a first connection terminal for outputting a first detecting signal. The level shifter adjusts a voltage level of the first detecting signal to generate a second detecting signal.

20 Claims, 4 Drawing Sheets

| Component \ Stage | Voltage drop componet (130) | Transistor component (Q1) | Transistor component (Q2) | Second detecting signal (DET2#) |
|---|---|---|---|---|
| First Stage | OFF | OFF | OFF | First Logic Level "1" |
| Second Stage | ON | OFF | OFF | First Logic Level "1" |
| Third Stage | ON | ON | ON | Second Logic Level "0" |

FIG. 2

| Resistance of the second resistor component (R2) | Startup current flowing through the voltage drop component ($I_1$) |
|---|---|
| 470KΩ | 24mA |
| 200KΩ | 20mA |
| 100KΩ | 18mA |
| 68KΩ | 14mA |
| 47KΩ | 10mA |

FIG. 3

ANTENNA SENSE CIRCUIT AND DIGITAL RADIO RECEIVER THEREOF

BACKGROUND OF THE INVENTION

1. Field of the Invention

The present invention relates to an antenna sense circuit and a related digital radio receiver, and more particularly, to an antenna sense circuit and a related digital radio receiver capable of improving voltage drops and a startup current.

2. Description of the Prior Art

Digital radio systems have been applied to automotive products as well as handheld products with an increasing trend, such as: a digital audio broadcasting (DAB) technology, a satellite radio technology, and Media FLO technology. Generally speaking, a digital radio product usually needs a set of antenna sense circuit used for providing power supply, system information, and error detections to an external antenna.

Currently, there are two kinds of antenna sense circuits widely adopted in the digital radio products. The first kind of antenna sense circuit is a simple diode current detecting circuit. As the name implies, it makes use of a diode to detect a startup current in order to determine whether an external antenna is coupled to the digital radio product. Such circuit has advantages of simple designs and low cost, but it has disadvantages of insufficient startup currents and exceeding voltage drops of diodes. The second kind of antenna sense circuit is a comparator current detecting circuit. Such circuit does not have the problem of exceeding voltage drops of diodes and it has advantages of adjusting the magnitude of the startup current, but it has a complicated circuit and costs too much.

Hence, how to improve the problems of voltage drops and the startup current, simplify circuits, and save cost have become an important topic of this field.

SUMMARY OF THE INVENTION

It is one of the objectives of the present invention to provide an antenna sense circuit and a related digital radio receiver to solve the abovementioned problems.

The present invention discloses an antenna sense circuit. The antenna sense circuit includes a detector and a level shifter. The detector includes a voltage drop component, a first resistor component, a second resistor component, and a transistor component. The voltage drop component has a first terminal being coupled to a first power supply, and a second terminal. The first resistor component has a first terminal and a second terminal, wherein the first terminal of the first resistor component is coupled to the second terminal of the voltage drop component. The second resistor component has a first terminal and a second terminal, wherein the first terminal of the second resistor component is coupled to the second terminal of the first resistor component, and the second terminal of the second resistor component is coupled to a second power supply. The transistor component has a control terminal, a first connection terminal, and a second connection terminal, wherein the control terminal is coupled to the second terminal of the first resistor component and the first terminal of the second resistor component, the second connection terminal is coupled to the first power supply, and the first connection terminal is used for outputting a first detecting signal. The level shifter is coupled to the first connection terminal of the transistor component, for receiving the first detecting signal and for adjusting a voltage level of the first detecting signal to generate a second detecting signal. Herein the second resistor component can be an adjustable resistor, and a resistance of the second resistor component determines a turn-on time of the transistor component.

The present invention discloses a digital radio receiver. The digital radio receiver includes an antenna sense circuit, a DC block device, a RF tuner, and a micro-processor. The antenna sense circuit consists of a detector and a level shifter. The detector includes a voltage drop component, a first resistor component, a second resistor component, and a transistor component. The voltage drop component has a first terminal being coupled to a first power supply, and a second terminal. The first resistor component has a first terminal and a second terminal, wherein the first terminal of the first resistor component is coupled to the second terminal of the voltage drop component. The second resistor component has a first terminal and a second terminal, wherein the first terminal of the second resistor component is coupled to the second terminal of the first resistor component, and the second terminal of the second resistor component is coupled to a second power supply. The transistor component has a control terminal, a first connection terminal, and a second connection terminal, wherein the control terminal is coupled to the second terminal of the first resistor component and the first terminal of the second resistor component, the second connection terminal is coupled to the first power supply, and the first connection terminal is used for outputting a first detecting signal. The level shifter is coupled to the first connection terminal of the transistor component, for receiving the first detecting signal and for adjusting a voltage level of the first detecting signal to generate a second detecting signal. The DC block device receives a RF signal from the external antenna, and filters out DC components of the RF signal so as to generate a filtered RF signal. The RF tuner is coupled to the DC block device, for transforming the filtered RF signal into an IF signal. The micro-processor is coupled to the antenna sense circuit and the RF tuner, for receiving the second detecting signal and the IF signal, and for transforming the IF signal into an audio/video output signal.

The present invention discloses a digital radio receiver. The digital radio receiver includes an antenna sense circuit and a micro-processor. The antenna sense circuit consists of a detector and a level shifter. The detector includes a voltage drop component, a first resistor component, a second resistor component, and a transistor component. The voltage drop component has a first terminal being coupled to a first power supply, and a second terminal. The first resistor component has a first terminal and a second terminal, wherein the first terminal of the first resistor component is coupled to the second terminal of the voltage drop component. The second resistor component has a first terminal and a second terminal, wherein the first terminal of the second resistor component is coupled to the second terminal of the first resistor component, and the second terminal of the second resistor component is coupled to a second power supply. The transistor component has a control terminal, a first connection terminal, and a second connection terminal, wherein the control terminal is coupled to the second terminal of the first resistor component and the first terminal of the second resistor component, the second connection terminal is coupled to the first power supply, and the first connection terminal is used for outputting a first detecting signal. The level shifter is coupled to the first connection terminal of the transistor component, for receiving the first detecting signal and for adjusting a voltage level of the first detecting signal to generate a second detecting signal. The micro-processor is coupled to the antenna sense circuit, for processing a digital radio signal received by the external antenna. When the antenna sense circuit is coupled to the external antenna and a startup current flowing through the voltage drop component has reached a threshold, the voltage drop component is turned on, the transistor component is turned on, and the antenna sense circuit generates the second detecting signal to notify the micro-processor that the antenna sense circuit is coupled to the external antenna.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram showing statuses of the components (including the voltage drop component 130, the transistor component Q1, and the transistor component Q2) shown in FIG. 1 at different stages.

FIG. 3 is a diagram illustrating a relationship between the resistance of the second resistor component and a startup current flowing through the voltage drop component shown in FIG. 1.

DETAILED DESCRIPTION

Figure 1:
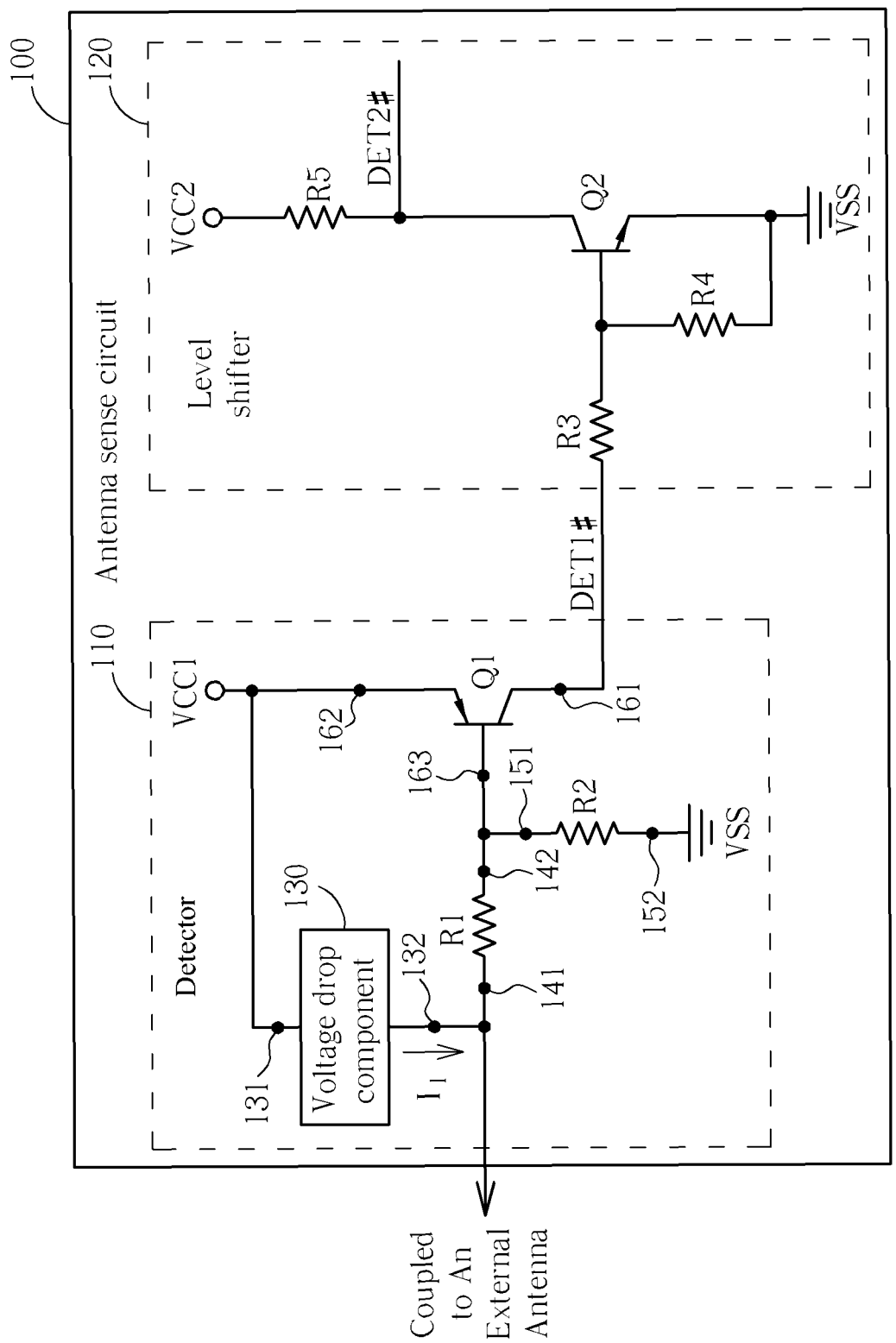
FIG. 1 is a circuit diagram of an antenna sense circuit according to an embodiment of the present invention.

Please refer to FIG. 1. FIG. 1 is a circuit diagram of an antenna sense circuit 100 according to an embodiment of the present invention. As FIG. 1 depicts, the antenna sense circuit 100 includes a detector 110 and a level shifter 120, wherein the detector 110 consists of a voltage drop component 130, a first resistor component R1, a second resistor component R2, and a transistor component Q1. The voltage drop component 130 has a first terminal 131 and a second terminal 132, wherein the first terminal 131 of the voltage drop component 130 is coupled to a first power supply VCC1, and the second terminal 132 of the voltage drop component 130 is coupled to a first terminal 141 of the first resistor component R1. The first resistor component R1 has a first terminal 141 and a second terminal 142, and the second resistor component R2 has a first terminal 151 and a second terminal 152 as well. In addition, the second terminal 152 of the second resistor component R2 is coupled to a second power supply VSS, such as a grounding terminal. The transistor component Q1 has a control terminal 163, a first connection terminal 161, and a second connection terminal 162. Herein the control terminal 163 is coupled to the second terminal 142 of the first resistor component R1 and the first terminal 151 of the second resistor component R2, the second connection terminal 162 is coupled to the first power supply VCC1, and the first connection terminal 161 is used for outputting a first detecting signal DET1#.

Furthermore, the level shifter 120 includes a transistor component Q2 and three resistor components R3, R4, and R5. The connection manner of the transistor component Q2 and the resistor components R3, R4, and R5 is already shown as FIG. 1, and further description is omitted here for brevity. What calls for special attention is that the level shifter 120 is coupled to the first connection terminal 161 of the transistor component Q1, for receiving the first detecting signal DET1# and for adjusting a voltage level of the first detecting signal DET1# to generate a second detecting signal DET2#. As an illustration, the voltage level of the first detecting signal DET1# is 5V, while the voltage level of the second detecting signal DET2# is 1.8V or 3.3V, but this is not meant to be limitations of the present invention. Herein the antenna sense circuit 100 makes use of the logic level (e.g., "0" or "1") of the second detecting signal DET2# to determine whether an external antenna (not shown) is coupled to the antenna sense circuit 100 or not.

Please note that the antenna sense circuit 100 can be disposed in a digital radio receiver, such as a digital audio broadcasting system (DAB), a satellite radio system, and a Media FLO. Those skilled in the art should appreciate that the present invention is not limited to this only, and the antenna sense circuit 100 can be applied to other products as well.

In one embodiment, the voltage drop component 130 may be a resistor, but this should not be considered as limitations of the present invention. In another embodiment, the voltage drop component 130 may be a diode, and a forward bias of the diode may be smaller than 0.7V. As an illustration, the voltage drop component 130 can be implemented by a Schottky diode, and the Schottky diode having a forward bias equaling 0.3V can be chosen. Therefore, the problem which resulted from that the voltage drop of the diode is too large can be improved.

Please note that in this embodiment, the transistor component Q1 can be a bipolar junction transistor (BJT), and thus the control terminal 163 is a base, the first connection terminal 161 is a collector, and the second connection 162 is an emitter. In addition, the second resistor component R2 can be an adjustable resistor, such that a voltage difference (namely, the base-emitter voltage $V_{BE}$) between the control terminal 163 and the second connection terminal 162 of the transistor component Q1 can be changed by adjusting a resistance proportion of the first resistor component R1 to the second resistor component R2. Generally speaking, a BJT will be turned on only when its base-emitter voltage $V_{BE}$ is greater than 0.7V. That is to say, a turn-on time of the transistor component Q1 can be determined by means of adjusting the resistance of the second resistor component R2. Those skilled in the art should appreciate that the resistance of the first resistor component R1 and/or the resistance of the second resistor component R2 can be designed depending on practical demands.

In the following descriptions, operations for each component of the antenna sense circuit 100 at different stages will be further explained. Please referrer to FIG. 1 together with FIG. 2, wherein FIG. 2 is a diagram showing statuses of the components (including the voltage drop component 130, the transistor component Q1, and the transistor component Q2) shown in FIG. 1 at different stages. During a first stage, it is aimed at a first condition that the antenna sense circuit 100 is not coupled to an external antenna yet; during a second stage, it is aimed at a second condition that the antenna sense circuit 100 is coupled to the external antenna and a startup current $I_1$ flowing through the voltage drop component 130 has not reached a threshold (e.g., 20 mA); while during a third stage, it is aimed at a third condition that the antenna sense circuit 100 is coupled to the external antenna and the startup current $I_1$ flowing through the voltage drop component 130 has reached the threshold.

During the first stage, the antenna sense circuit 100 is not coupled to an external antenna in the meanwhile. Since there is no current flowing through the voltage drop component 130, the voltage drop component 130 does not have any voltage drop on it. As a result, the voltage drop component 130 is turned off, the transistor component Q1 is turned off, and the transistor component Q2 is turned off; at this time, the second detecting signal DET2# has a first logic level (e.g., "1").

During the second stage, the antenna sense circuit 100 is coupled to the external antenna and the startup current $I_1$ flowing through the voltage drop component 130 has not reached a threshold in the meanwhile. Since there is a small current flowing through the voltage drop component 130, the voltage drop component 130 has a corresponding voltage drop on it. Due to the voltage drop of the voltage drop component 130 (such as, a diode) increasing as the startup current $I_1$ increases, the startup current $I_1$ is not large enough and therefore a divided voltage generated from the second resistor component R2 is unable to provide an adequate voltage difference to turn on the transistor component Q1. As a result, the voltage drop component 130 is turned on, the transistor component Q1 is turned off, and the transistor component Q2 is turned off; at this time, the second detecting signal DET2# has the first logic level (e.g., "1") as well.

During the third stage, the antenna sense circuit 100 is coupled to the external antenna and the startup current $I_1$ flowing through the voltage drop component 130 has reached the threshold in the meanwhile. Since there is a large current flowing through the voltage drop component 130, the voltage drop component 130 has a corresponding voltage drop on it. Due to the voltage drop of the voltage drop component 130 increasing as the startup current $I_1$ increases, and therefore a divided voltage generated from the second resistor component R2 is able to provide an adequate voltage difference to turn on the transistor component Q1. In addition, it is able to provide an adequate voltage difference to turn on the transistor component Q2 due to the conduction of the transistor component Q1. As a result, the voltage drop component 130 is turned on, the transistor component Q1 is turned on, and the transistor component Q2 is turned on; at this time, the second detecting signal DET2# has a second logic level (e.g., "0").

What calls for special attention is that, during the first stage and during the second stage, the transistor components Q1 and Q2 (such as BJTs) operate in the cut-off region; while during the third stage, the transistor components Q1 and Q2 operate in the saturation region in order to implement the detection function of the antenna sense circuit 100.

Please refer to FIG. 3. FIG. 3 is a diagram illustrating a relationship between the resistance of the second resistor component R2 and the startup current $I_1$ flowing through the voltage drop component 130 shown in FIG. 1. In this embodiment, the data is generated from computer simulations under a setting condition that the first resistor component R1 is implemented by selecting a resistor having a resistance equaling 1KΩ, and the voltage drop component 130 is implemented by selecting a diode having a forward bias equaling 0.3V. As can be seen from the table shown in FIG. 3, the startup current $I_1$ flowing through the voltage drop component 130 is direct proportional to the resistance of the second resistor component R2. In other words, the magnitude of the startup current $I_1$ can be adjusted by means of changing the resistance of the second resistor component R2. In doing so, the problem that the startup current $I_1$ is too small can be solved, and thus erroneous actions can be avoided. Moreover, the magnitude of the startup current $I_1$ can be designed depending on practical demands in order to satisfy various specifications of the external antenna, such that the antenna sense circuit 100 is capable of achieving a goal of multi-functions.

In short, the startup current $I_1$ flowing through the voltage drop component 130 is direct proportional to the resistance of the second resistor component R2, and the resistance of the second resistor component R2 is able to determine the turn-on time of the transistor component Q1. That is to say, the turn-on time of the transistor component Q1 as well as the magnitude of the startup current $I_1$ can be adjusted by changing the resistance of the second resistor component R2.

Figure 4:
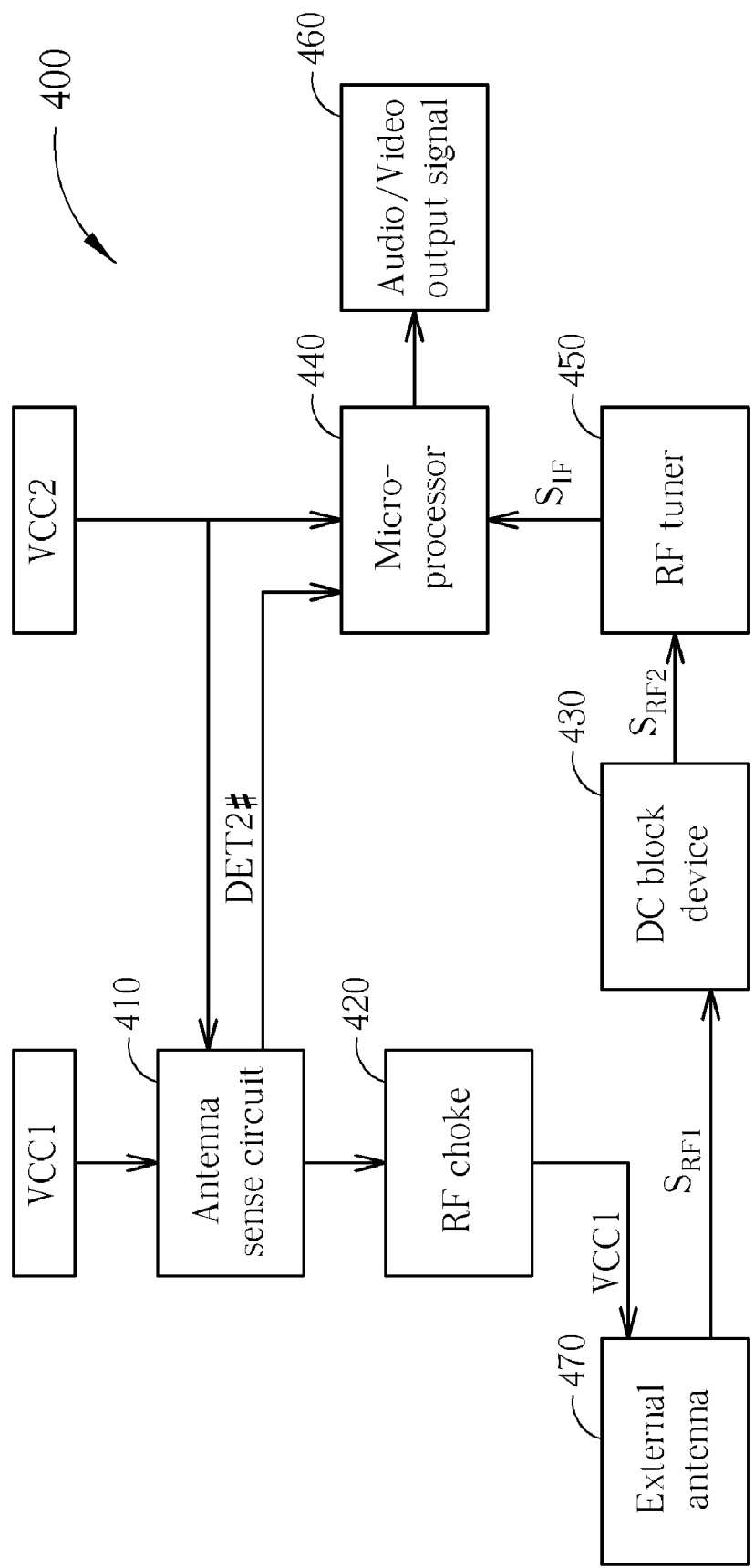
FIG. 4 is a diagram of a digital radio receiver according to an embodiment of the present invention.

Please refer to FIG. 4. FIG. 4 is a diagram of a digital radio receiver 400 according to an embodiment of the present invention. As FIG. 4 depicts, the digital radio receiver 400 includes, but is not limited to, an antenna sense circuit 410, an RF choke 420, a DC block device 430, a micro-processor 440, and an RF tuner 450. Furthermore, a first power supply VCC1 provides power to the antenna sense circuit 410, and a second power supply VCC2 provides power to the antenna sense circuit 410 as well as the micro-processor 440 at the same time. Please note that when the antenna sense circuit 410 detects that an external antenna 470 is coupled to the digital radio receiver 400, it will provide the first power supply VCC1 to the external antenna 470 via the RF choke 420, and thus the external antenna 470 can be used for receiving digital radio signals.

In this embodiment, the antenna sense circuit 410 is utilized for detecting whether an external antenna 470 is coupled to the digital radio receiver 400 and for generating the second detecting signal DET2# to notify the micro-processor 440; and the antenna sense circuit 410 can be implemented by the antenna sense circuit 100 (or a varied embodiment of the antenna sense circuit 100) shown in FIG. 1. The RF choke 420 (such as an inductor) is coupled between the antenna sense circuit 410 and the external antenna 470, for blocking the digital radio signals (e.g., the radio frequency signal $S_{RF1}$) derived from the external antenna 470 from getting into the antenna sense circuit 410. In addition, the DC block device 430 receives the radio signal $S_{RF1}$ derived from the external antenna 470 and then filters out DC components of the radio signal $S_{RF1}$ so as to generate a filtered radio frequency signal $S_{RF2}$ (including AC components only). The RF tuner 450 is coupled to the DC block device 430, for transforming the filtered radio frequency $S_{RF2}$ into an intermediate-frequency signal $S_{IF}$. After that, the micro-processor 440 is coupled to the antenna sense circuit 410 and the RF tuner 450, for receiving the second detecting signal DET2# and the intermediate-frequency signal $S_{IF}$, and for transforming the intermediate-frequency signal $S_{IF}$ into an audio/video output signal 460.

The abovementioned embodiments are presented merely for describing the features of the present invention, and in no way should be considered to be limitations of the scope of the present invention. In summary, the present invention provides an antenna sense circuit and a related digital radio receiver. The antenna sense circuit 100 disclosed in the present invention is capable of adjusting the turn-on time of the transistor component Q1 (and/or the turn-on time of the transistor component Q2) and adjusting the magnitude of the startup current $I_1$ by means of changing the resistance of the second resistor component R2. Therefore, the problem that the startup current $I_1$ is too small can be improved, and thus erroneous actions can be avoided. Additionally, the voltage drop component 130 can be implemented by selecting a resistor or a diode having a smaller forward bias, such that the problem which resulted from that the voltage drop is too large can be solved. Furthermore, the antenna sense circuit 100 disclosed in the present invention has a streamlined circuit and is a low-cost implementation, which is suitable for a common digital radio product.

Those skilled in the art will readily observe that numerous modifications and alterations of the device and method may be made while retaining the teachings of the invention.

What is claimed is:

1. An antenna sense circuit, comprising:
   a detector, comprising:
   a voltage drop component, having a first terminal and a second terminal, the first terminal being directly coupled to a first power supply;

a first resistor component, having a first terminal and a second terminal, the first terminal of the first resistor component being coupled to the second terminal of the voltage drop component;

a second resistor component, having a first terminal and a second terminal, the first terminal of the second resistor component being coupled to the second terminal of the first resistor component, and the second terminal of the second resistor component being coupled to a second power supply; and a transistor component, having a control terminal, a first connection terminal, and a second connection terminal, the control terminal being coupled to the second terminal of the first resistor component and the first terminal of the second resistor component, the second connection terminal being directly coupled to the first power supply, and the first connection terminal used for outputting a first detecting signal; and a level shifter, coupled to the first connection terminal of the transistor component, for receiving the first detecting signal and for adjusting a voltage level of the first detecting signal to generate a second detecting signal.

2. The antenna sense circuit of claim 1, wherein the voltage drop component is a resistor.

3. The antenna sense circuit of claim 1, wherein the voltage drop component is a diode, and the diode has a forward bias being smaller than 0.7V.

4. The antenna sense circuit of claim 3, wherein the diode is a Schottky diode.

5. The antenna sense circuit of claim 1, wherein the second resistor component is an adjustable resistor, and a resistance of the second resistor component determines a turn-on time of the transistor component.

6. The antenna sense circuit of claim 1, wherein the transistor component is a bipolar junction transistor, the control terminal is a base, the first connection terminal is a collector, and the second connection terminal is an emitter.

7. The antenna sense circuit of claim 1, wherein:
when the antenna sense circuit is not coupled to an external antenna, the voltage drop component is turned off, the transistor component is turned off, and the second detecting signal has a first logic level;
when the antenna sense circuit is coupled to the external antenna and a startup current flowing through the voltage drop component has not reached a threshold, the voltage drop component is turned on, the transistor component is turned off, and the second detecting signal has the first logic level; and
when the antenna sense circuit is coupled to the external antenna and the startup current flowing through the voltage drop component has reached the threshold, the voltage drop component is turned on, the transistor component is turned on, and the second detecting signal has a second logic level being different from the first logic level.

8. The antenna sense circuit of claim 7, wherein the startup current flowing through the voltage drop component is direct proportional to a resistance of the second resistor component.

9. The antenna sense circuit of claim 1, wherein when the antenna sense circuit is coupled to an external antenna and a startup current flowing through the voltage drop component has reached a threshold, the voltage drop component is turned on, and the transistor component is turned on.

10. A digital radio receiver, comprising:
an antenna sense circuit, for detecting whether an external antenna is coupled to digital radio receiver, the antenna sense circuit comprising:
a detector, comprising:
a voltage drop component, having a first terminal and a second terminal, the first terminal being directly coupled to a first power supply;
a first resistor component, having a first terminal and a second terminal, the first terminal of the first resistor component being coupled to the second terminal of the voltage drop component;
a second resistor component, having a first terminal and a second terminal, the first terminal of the second resistor component being coupled to the second terminal of the first resistor component, and the second terminal of the second resistor component being coupled to a second power supply; and
a transistor component, having a control terminal, a first connection terminal, and a second connection terminal, the control terminal being coupled to the second terminal of the first resistor component and the first terminal of the second resistor component, the second connection terminal being directly coupled to the first power supply, and the first connection terminal used for outputting a first detecting signal; and
a level shifter, coupled to the first connection terminal of the transistor component, for receiving the first detecting signal and for adjusting a voltage level of the first detecting signal to generate a second detecting signal;
a DC block device, for receiving a radio frequency (RF) signal from the external antenna, and for filtering out DC components of the RF signal so as to generate a filtered RF signal;
a RF tuner, coupled to the DC block device, for transforming the filtered RF signal into an intermediate-frequency (IF) signal; and
a micro-processor, coupled to the antenna sense circuit and the RF tuner, for receiving the second detecting signal and the IF signal, and for transforming the IF signal into an audio/video output signal.

11. The digital radio receiver of claim 10, wherein the voltage drop component disposed in the antenna sense circuit is a resistor.

12. The digital radio receiver of claim 10, wherein the voltage drop component disposed in the antenna sense circuit is a diode, and the diode has a forward bias being smaller than 0.7V.

13. The digital radio receiver of claim 12, wherein the diode is a Schottky diode.

14. The digital radio receiver of claim 10, wherein the second resistor component disposed in the antenna sense circuit is an adjustable resistor, and a resistance of the second resistor component determines a turn-on time of the transistor component.

15. The digital radio receiver of claim 10, wherein the transistor component disposed in the antenna sense circuit is a bipolar junction transistor (BJT), the control terminal is a base, the first connection terminal is a collector, and the second connection terminal is an emitter.

16. The digital radio receiver of claim 10, wherein:
when the antenna sense circuit is not coupled to an external antenna, the voltage drop component is turned off, the transistor component is turned off, and the second detecting signal has a first logic level;
when the antenna sense circuit is coupled to the external antenna and a startup current flowing through the voltage drop component has not reached a threshold, the voltage drop component is turned on, the transistor component is turned off, and the second detecting signal has the first logic level; and when the antenna sense circuit is coupled to the external antenna and the startup current flowing through the voltage drop component has reached the threshold, the voltage drop component is turned on, the transistor component is turned on, and the second detecting signal has a second logic level being different from the first logic level.

17. The digital radio receiver of claim 16, wherein the startup current flowing through the voltage drop component is direct proportional to a resistance of the second resistor component.

18. The digital radio receiver of claim 10, wherein when the antenna sense circuit is coupled to the external antenna and a startup current flowing through the voltage drop component has reached a threshold, the voltage drop component is turned on, the transistor component is turned on, and the antenna sense circuit generates the second detecting signal to notify the micro-processor that the antenna sense circuit is coupled to the external antenna.

19. A digital radio receiver, comprising:
- an antenna sense circuit, for detecting whether an external antenna is coupled to digital radio receiver, the antenna sense circuit comprising:
  - a detector, comprising:
    - a voltage drop component, having a first terminal and a second terminal, the first terminal being directly coupled to a first power supply;
    - a first resistor component, having a first terminal and a second terminal, the first terminal of the first resistor component being coupled to the second terminal of the voltage drop component;
    - a second resistor component, having a first terminal and a second terminal, the first terminal of the second resistor component being coupled to the second terminal of the first resistor component, and the second terminal of the second resistor component being coupled to a second power supply; and
    - a transistor component, having a control terminal, a first connection terminal, and a second connection terminal, the control terminal being coupled to the second terminal of the first resistor component and the first terminal of the second resistor component, the second connection terminal being directly coupled to the first power supply, and the first connection terminal used for outputting a first detecting signal; and
  - a level shifter, coupled to the first connection terminal of the transistor component, for receiving the first detecting signal and for adjusting a voltage level of the first detecting signal to generate a second detecting signal; and
- a micro-processor, coupled to the antenna sense circuit, for processing a digital radio signal received by the external antenna.

20. The digital radio receiver of claim 19, wherein when the antenna sense circuit is coupled to the external antenna and a startup current flowing through the voltage drop component has reached a threshold, the voltage drop component is turned on, the transistor component is turned on, and the antenna sense circuit generates the second detecting signal to notify the micro-processor that the antenna sense circuit is coupled to the external antenna.

* * * * *